United States Patent [19]
Tanaka

[11] Patent Number: 5,751,678
[45] Date of Patent: May 12, 1998

[54] DUBBING SYSTEM

[75] Inventor: Yozo Tanaka, Kanagawa, Japan

[73] Assignee: Sony Corporation, Japan

[21] Appl. No.: 802,385

[22] Filed: Feb. 19, 1997

[30] Foreign Application Priority Data

Feb. 28, 1996 [JP] Japan ................................. 8-067274

[51] Int. Cl.$^6$ ................................................. G11B 7/00
[52] U.S. Cl. ................................................. 369/84; 369/58
[58] Field of Search ................................. 369/84, 83, 47, 369/48, 49, 50, 54, 58, 59; 360/13, 15

[56] References Cited

U.S. PATENT DOCUMENTS 5,428,598  6/1995  Veldhuis et al. ................... 369/84 X Primary Examiner—Muhammad N. Edun
Attorney, Agent, or Firm—Limbach & Limbach L.L.P.

[57] ABSTRACT

A first aspect of the present invention is a dubbing system for copying information recorded on a first record medium to a second record medium. Character information corresponding to a program recorded on the first record medium is stored in a memory. When the second record medium is a blank disc, the character information recorded in the memory is copied to a management region of the second record medium corresponding to the program of the first record medium. A second aspect of the present invention is a dubbing system for recording start time, stop time, and radio station name of a desired program to the record management region when information received from a tuner is recorded to the second record medium by a timer record operation with a timer.

2 Claims, 5 Drawing Sheets

| | DISC MEMO | TOTAL TIME | TOTAL PROGRAM NUMBER |
|---|---|---|---|
| 1 | ○○○○○ | 50:42 | 10 |
| 2 | ××××× | 48:60 | 12 |
| 3 | △△△△△ | 56:20 | 8 |
| ⋮ | ⋮ | ⋮ | ⋮ |

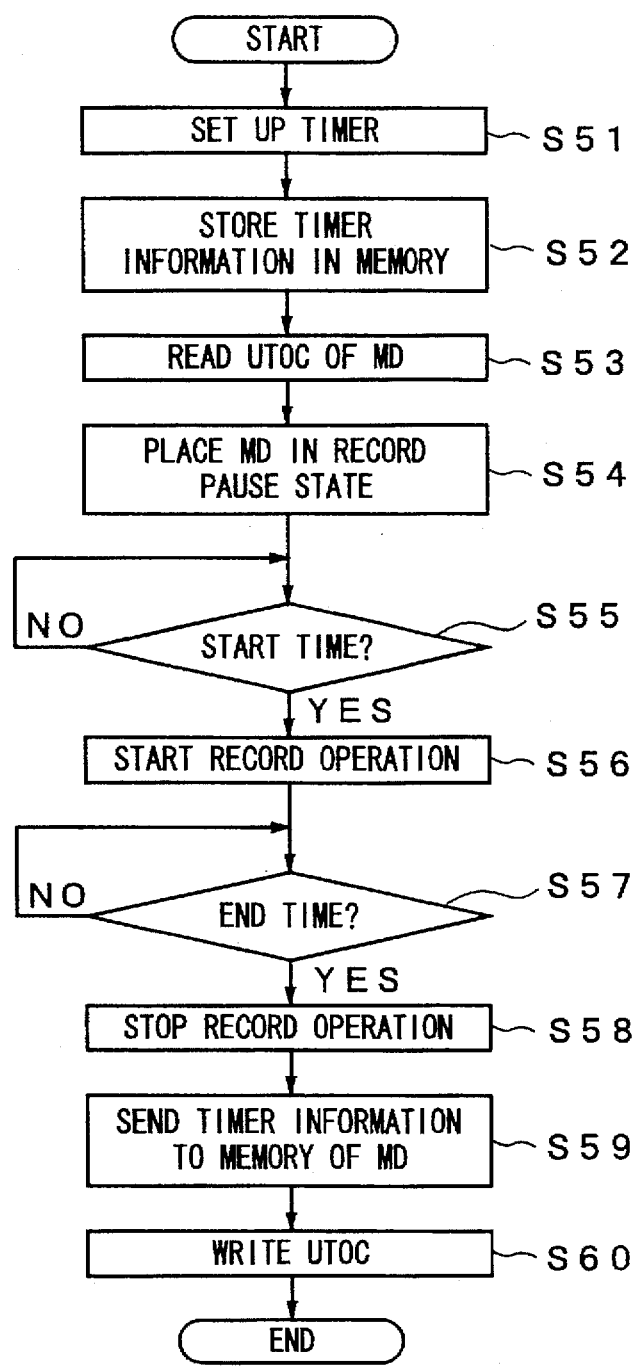

DUBBING SYSTEM

BACKGROUND OF THE INVENTION

1. Field of the Invention

The present invention relates to a record/playback system suitable for synchronously dubbing information from a compact disc player to a mini disc recorder in an audio system that also includes a tuner, an amplifier, and so forth and relates to a record system suitable for timer-recording information from a tuner to a mini disc recorder.

2. Description of the Related Art

An audio system that integrates for example a tuner, a CD (Compact Disc) player, a MD (Mini Disc) player, and an amplifier has become common. Such an audio system may have a so-called synchronous dubbing function that allows the user to start and stop the playback and record operations of the playback unit and the record unit with one key operation. With the synchronous dubbing function, in the case that audio information recorded on a compact disc is dubbed to a mini disc, when the user starts the record operation of the MD recorder, the CD player is automatically placed in the playback mode.

Such a system may have a timer record function that automatically starts the record operation at a predetermined time. With the timer record function, for example, the tuner is automatically turned on and a received signal of the tuner is automatically recorded to, for example the MD recorder.

The mini disc has a management region termed UTOC (User Table Of Content). In the UTOC, a disc name, a program name, and so forth can be recorded with alphanumeric characters and symbols. Conventionally, the user should input a disc name and a program name with key operations. In the case that an audio signal is recorded from a compact disc to a mini disc by the synchronous dubbing operation, after the dubbing operation is completed, the user should input a disc name and a program name with the key operations with reference to an index sheet attached to the compact disc. On the other hand, when the user performs the timer record operation, he or she should input record date, radio station name, and so forth as a disc name and a program name with key operations. The user should spend time to input a disc name and a program name.

OBJECTS AND SUMMARY OF THE INVENTION

From the above-described point of view, an object of the present invention is to provide a record/playback system that allows a disc name and a program name to be easily recorded on a mini disc when audio information is dubbed from a compact disc player to the mini disc.

Another object of the present invention is to provide a record/playback system that allows record date/time and radio station name to be easily recorded on a mini disc when audio information is timer-recorded from a tuner to a mini disc recorder.

To solve the above described problem, a first aspect of the present invention is a dubbing system, comprising a memory for storing character information corresponding to at least one program recorded on a first disc shaped record medium, a reproducing unit for reproducing information recorded on the first disc shaped record medium, a recording unit for copying information reproduced from the first disc shaped record medium to a second disc shaped record medium, a discriminator for determining whether or not all regions of the second disc shaped record medium are recordable, and a recording unit controller for causing the recording unit to copy character information stored in the memory to a management region of the second disc shaped record medium corresponding to a program copied to the second disc shaped record medium when the discriminator has determined that all the regions of the second disc shaped record medium are recordable.

A second aspect of the present invention is a dubbing system for recording a received signal of a desired radio station to a disc shaped record medium, comprising a decoder for demodulating the received signal of the radio station, a timer setup unit for setting up program start time, program end time, and radio station, a timer counter for counting time, a memory for storing character information about the radio station that has been set up by the timer setup unit, and a recording unit for starting receiving the signal of the radio station that has been set up by the timer setup unit and starting recording the received signal to the disc shaped record medium when the counted time of the timer counter accords with the program start time that has been set up by the timer setup unit, for stopping recording the received signal to the disc shaped record medium when the counted time of the timer counter accords with the program end time that has been set up by the timer setup unit, and for recording character information about the radio station stored in the memory to the management region of the disc shaped record medium after the record operation is stopped.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a flow chart showing a control sequence of a dubbing operation according to the second embodiment of the present invention.

DETAILED DESCRIPTION OF THE PREFERRED EMBODIMENT

Figures 1, 2:
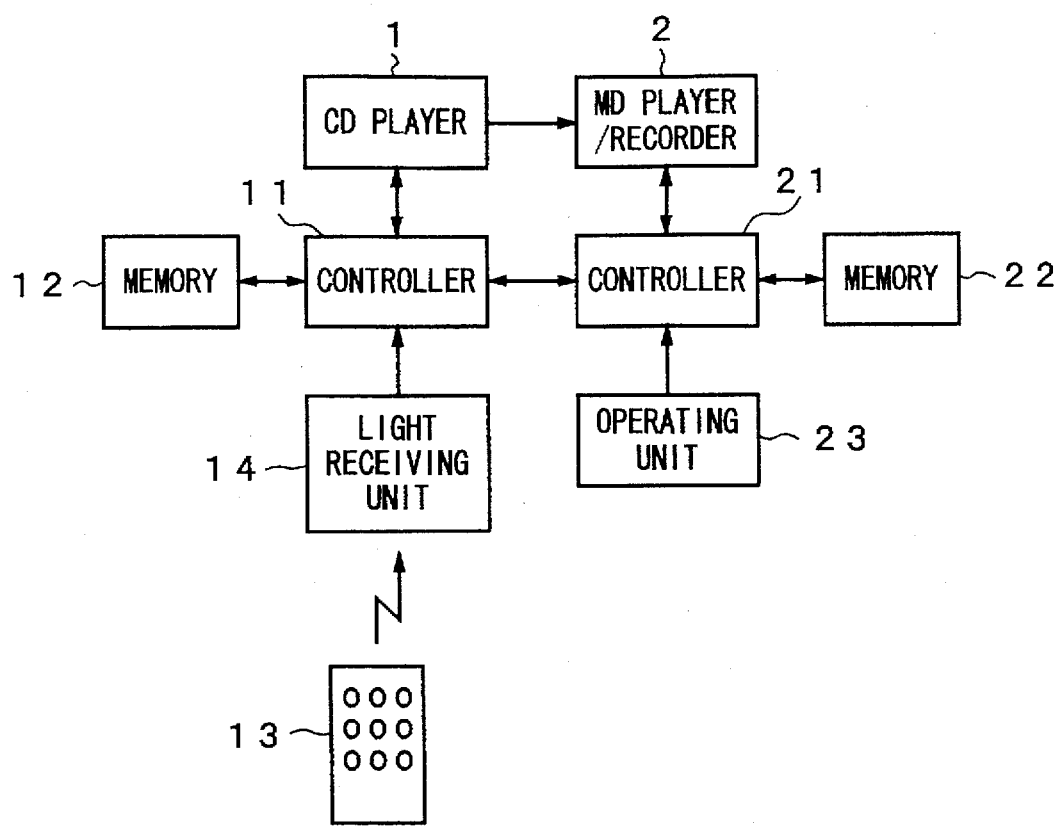
FIG. 1 is a block diagram showing a dubbing system according to a first embodiment of the present invention.
FIG. 2 is a table showing a disc memo stored in a memory.

Next, an embodiment of the present invention according to the present invention will be described with reference to the accompanying drawings. FIG. 1 shows an example of an audio system according to the present invention. In this example, when the synchronous dubbing operation is performed from a CD player unit 1 to an MD player/recorder unit 2, character information such as a disc title and a program name on a compact disc is automatically recorded on a mini disc.

In FIG. 1, the CD player 1 reproduces information from the compact disc. The CD player 1 comprises a spindle motor that rotates the disc, an optical pickup that reads a signal of the disc, a servo circuit that includes a spindle servo circuit, a focus servo circuit, and a tracking servo circuit, and a signal processing circuit that decodes a reproduced signal of the optical pickup and performs an error correction process for the decoded signal. In association with the CD player unit 1, a controller 11 that controls all the operations of the CD player unit 1 is provided. A signal is supplied from a remote controller 13 to the controller 11 through a light receiving unit 14.

The CD player unit 1 may have a changer function that allows the user to select a desired one of a plurality of discs so as to reproduce information from the selected disc. With the changer function, information can be reproduced from discs on a one-by-one basis. Alternatively, information can be reproduced from discs in succession.

The CD player 1 also has a function termed disc memo. With the disc memo, the user can input a title or the like for each disc with alphanumeric characters and so forth. The disc memo is accomplished by a memory 12. In other words, the memory 12 stores the disc memo. When the user inputs alphanumeric characters with the remote controller 13, a disc memo is created. The disc memo is stored in the memory 12 corresponding to total time, total program number, and so forth read from TOC of each disc. When such a disc memo is stored in the memory 12, by comparing total time and total program number corresponding to TOC information of the disc with those stored in the memory 12, the user can easily know the content of the loaded disc.

The MD player/recorder unit 2 records or reproduces information to/from a mini disc. The MD player/recorder unit 2 comprises a spindle motor that rotates the disc, an optical pickup/magnetic head that records or reproduces a signal to/from the disc, a servo circuit that includes a spindle servo circuit, a focus servo circuit, and a tracking servo circuit, a signal processing circuit that demodulates a reproduced signal of the optical pickup and performs an error correction process for the demodulated signal, a shock proof memory, and a compressing/expanding circuit that compresses or expands a digital audio signal. In association with the MD player/recorder unit 2, a controller 21 that controls all the operations of the MD player/recorder unit 2 is provided. The user inputs data to the controller 21 with an operating unit 23.

Figure 3:
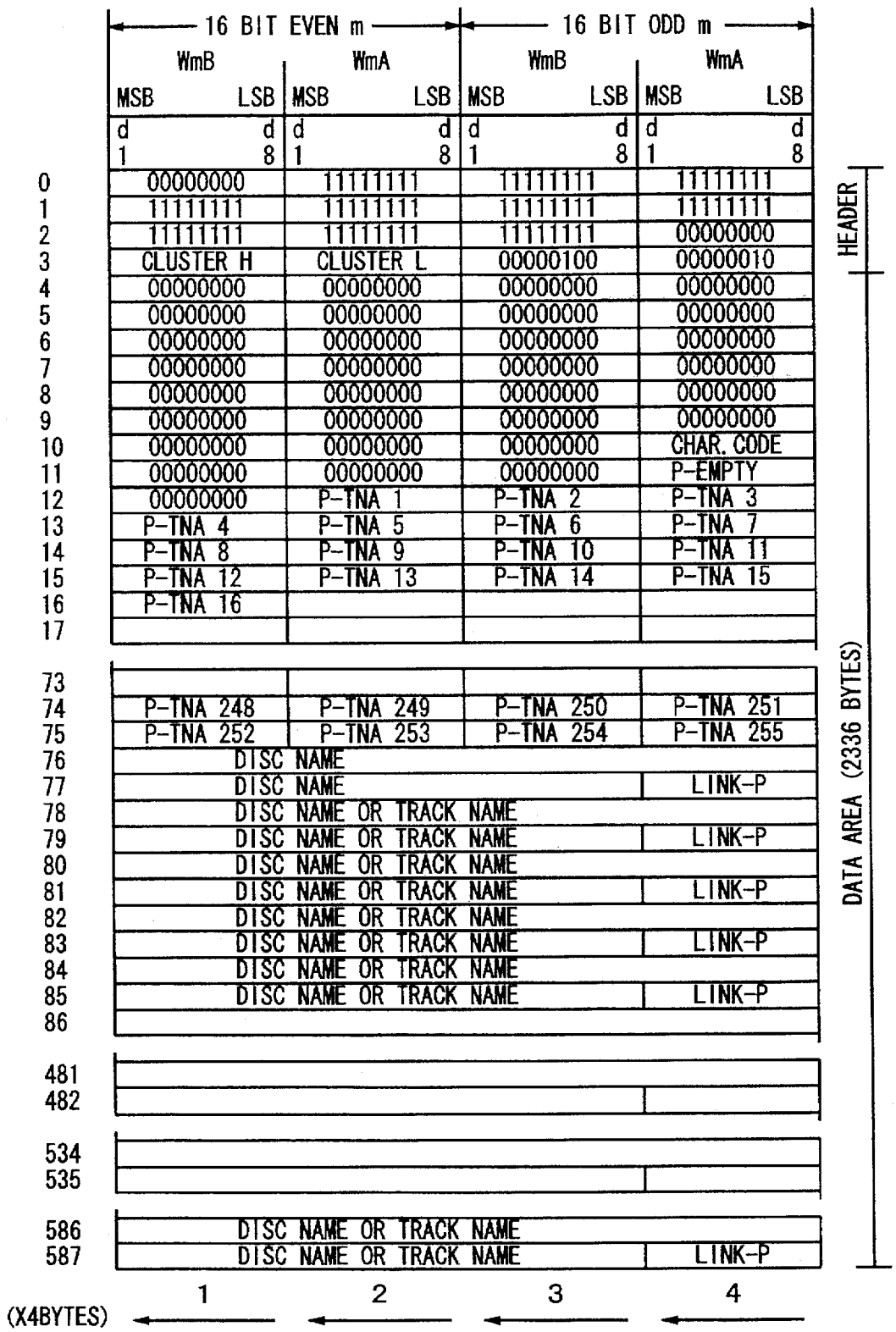
FIG. 3 is a schematic diagram showing the format of a management region of a record medium according to the present invention.

A mini disc has a management region termed UTOC. A disc name and a program name can be stored in the UTOC. FIG. 3 shows the structure of the UTOC. As shown in FIG. 3, the UTOC has a header area with a predetermined bit pattern. The header area is followed by a data area. P-EMPTY in the data area is a pointer that represents a first blank slot of the name table. P-TNAn is a pointer that represents a slot number corresponding to n-th program number of the name table. A disc name and a program name are placed at a position of P-TNAn. LINK-P represents a slot corresponding to each part to be linked in the case that one program is divided into a plurality of parts and discretely recorded on a mini disc.

Figure 4:
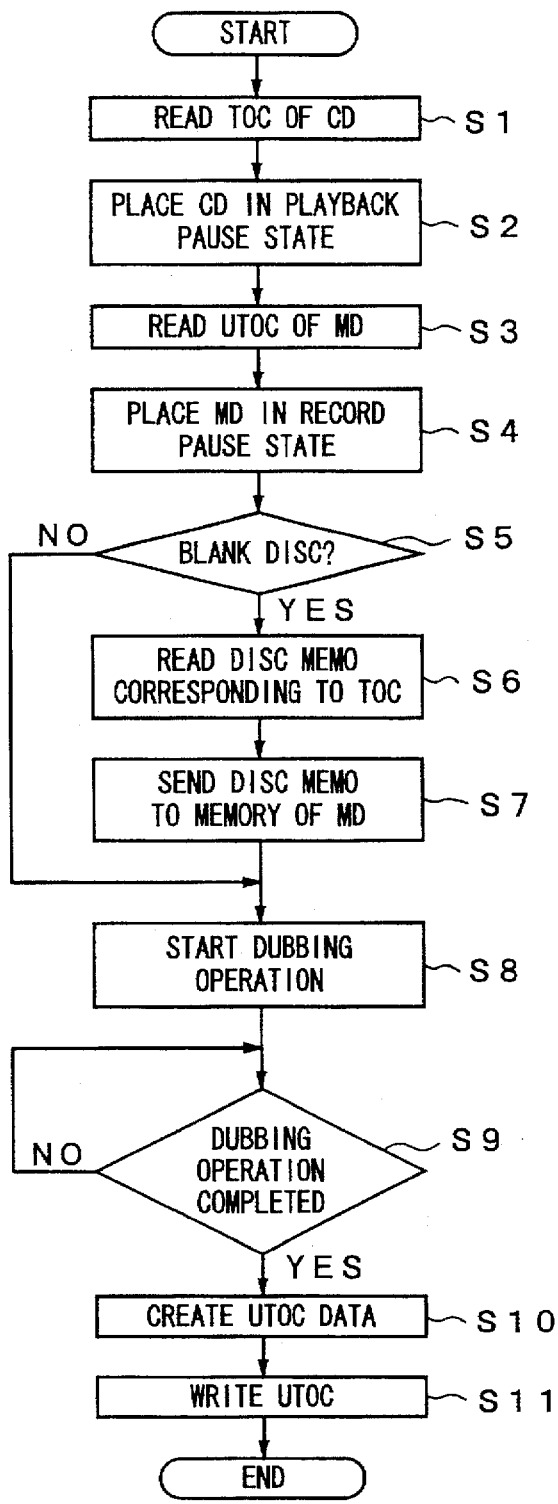
FIG. 4 is a flow chart showing a control sequence of the dubbing operation according to the first embodiment of the present invention.

In the system with the above-described structure, when the synchronous dubbing operation is performed from a compact disc to a mini disc, the following process is performed. FIG. 4 is a flow chart showing the process of the synchronous dubbing operation performed from a compact disc player to a mini disc recorder. In FIG. 4, the TOC of the loaded compact disc is read (at step S1). The CD player unit 1 is placed in the playback pause state (at step S2). The UTOC of the loaded mini disc of the MD recorder unit 2 is read (at step S3). The MD recorder unit 2 is placed in the record pause state (at step S4). It is determined whether or not the loaded mini disc is a blank disc (at step S5). When the determined result is Yes (namely, when the loaded mini disc is a blank disc), the disc memo corresponding to the TOC of the CD is read from the memory 12 (at step S6). The content of the disc memo is stored in the memory 22 of the MD recorder unit 2 (at step S7). The dubbing operation is performed from the compact disc of the CD player unit 1 to the mini disc of the MD recorder unit 2 (at step S8). At step S5, when the determined result is No (namely, when the loaded disc is not a blank disc), the flow advances to step S8. At step S8, the dubbing operation is performed from the compact disc of the CD player unit 1 to the mini disc of the MD recorder unit 2. When the dubbing operation is completed (at step S9), the UTOC data is edited corresponding to the data stored in the memory 22 (at step 10). When the dubbing operation is completed, the UTOC data in the memory 22 is recorded to the UTOC area of the mini disc (at step S11).

In the case that the loaded mini disc is a blank disc, when the synchronous dubbing operation is completed, the content of the disc memo of the compact disc is directly copied to the disc name of the UTOC of the mini disc. Thus, when the dubbing operation from the compact disc to the mini disc is completed, the user does not need to input the disc name.

Figure 5:
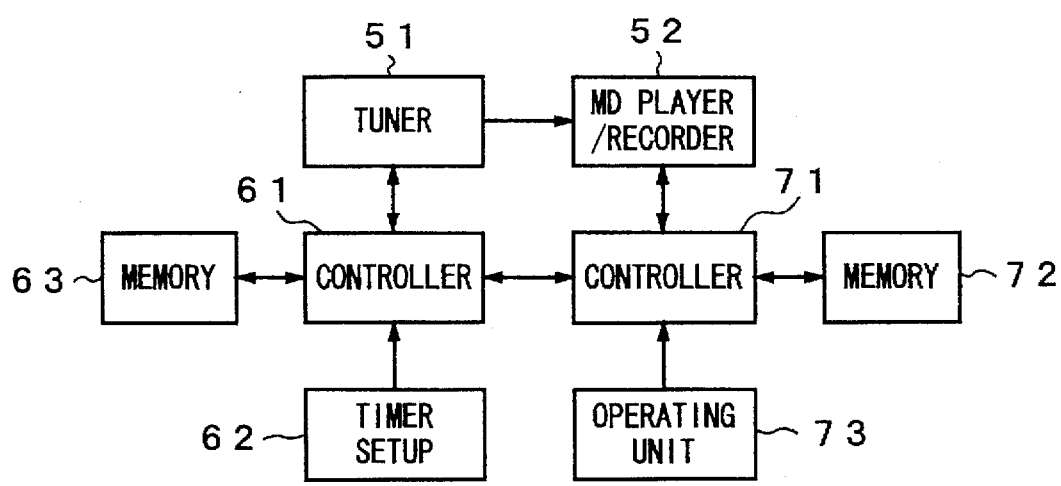
FIG. 5 is a block diagram showing a dubbing system according to a second embodiment of the present invention.

FIG. 5 shows another example of the audio system according to the present invention. In this example, when a timer record operation is performed from a tuner unit 51 to an MD recorder unit 52, a station name, record start time, and record end time are automatically recorded to a program name of the mini disc.

In FIG. 5, the tuner unit 51 receives an FM radio program or an AM radio program and demodulates the received signal. The tuner unit 51 comprises a frequency converting circuit, an intermediate frequency amplifying circuit, and an AM/FM demodulating circuit. In association with the tuner unit 51, a controller 61 that controls all the operations of the tuner unit 51 is provided. The controller 61 controls the frequency of a received signal. In association with the controller 61, a timer setup unit 62 is provided. The timer setup unit 62 sets up a radio station name, record start time, and record end time. The timer setup information is stored in a memory 63.

The MD recorder/player unit 52 records or reproduces information to/from a mini disc. The MD recorder/player unit 52 comprises a spindle motor that rotates the disc, an optical pickup/magnetic head that records or reproduces a signal to/from the disc, a servo circuit that includes a spindle servo circuit, a focus servo circuit, and a tracking servo circuit, a signal processing circuit that demodulates a reproduced signal of the optical pickup and performs an error correcting process for the demodulated signal, a shock proof memory, and a compressing/expanding circuit that compresses or expands the digital audio signal. In association with the MD player/recorder unit 52, a controller 71 that controls all the operations of the MD player/recorder unit 52 is provided.

At record start time that has been set up by the timer setup unit 62, the tuner unit 1 is turned on and placed in the receive mode for a radio station with a predetermined frequency. In addition, the MD recorder unit 52 is placed in the record state. Thus, a signal received by the tuner unit 51 is recorded to the MD recorder unit 52. At record end time, the tuner unit 51 is turned off and the record operation of the MD recorder unit 52 is stopped.

FIG. 6 is a flow chart showing the process in the case that a received signal of the tuner unit 51 is recorded to the MD recorder unit 52. In FIG. 6, first of all, the timer of the tuner unit 51 is set up (at step S51). After the timer is set up, the timer information is stored in the memory 63 (at step S52). Thereafter, the UTOC of the loaded mini disc is read (at step S53). The MD recorder unit 52 is placed in the record pause state (at step S54). It is determined whether or not the current time accords with the record start time (at step S55). At the timer start time, the tuner unit 51 is turned on and the record operation of the MD recorder unit 52 is started. A received signal of the tuner unit 51 is recorded to the MD recorder unit 52 (at step S56). Thereafter, it is determined whether or not the current time accords with the record end time (at step S57). When the current time accords with the record end time, the record operation is stopped (at step S58). The timer information (record start time, record end time, and radio station name of the received program) stored in the memory 63 is sent to the memory 72 (at step S59). The memory 72 creates the UTOC data corresponding to the timer information. The UTOC data created in the memory 72 is recorded in the UTOC area of the mini disc (at step S60). Thus, the record start time, record end time, and radio station name such as "FM ABC STATION (1:00 AM TO 2:00 AM)" are recorded to a program name of the mini disc.

In the above-described example, the record start time and record end time are recorded in the format of "time, minute, second". Instead, record date "year, month, day" may be recorded. Moreover, in combination with FM multiplexing broadcasting, information about artist name and program name may be recorded to a program name of the mini disc.

According to the present invention, in the case that the synchronous dubbing operation is performed from the compact disc player to the mini disc recorder, when the mini disc is a blank disc, the content of the disc memo of the compact disc is directly copied to a disc name of the mini disc. When a received signal of the tuner is recorded to a mini disc with the timer record operation, the record start time, record end time, and radio station name of the received program are directly copied to a program name of the mini disc. Thus, the operator does not need to input a disc name and a program name.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

I claim:

1. A dubbing system, comprising:

storing means for storing character information corresponding to at least one program recorded on a first record medium;

reproducing means for reproducing information recorded on the first record medium;

recording means for copying information reproduced from the first record medium to a second record medium;

determining means for determining whether or not all regions of the second record medium are recordable; and recording means controlling means for causing the recording means to copy character information stored in the storing means to a management region of the second record medium corresponding to a program copied to the second record medium when the determining means has determined that all the regions of the second record medium are recordable.

2. A dubbing system for recording a received signal of a desired radio station to a record medium, comprising:

demodulating means for demodulating the received signal of the radio station;

timer setup means for setting up program start time, program end time, and radio station;

timer means for counting time;

storing means for storing character information about the radio station that has been set up by the timer setup means; and recording means for starting receiving the signal of the radio station that has been set up by the timer setup means and starting recording the received signal to the record medium when the counted time of the timer means accords with the program start time that has been set up by the timer setup means, for stopping recording the received signal to the record medium when the counted time of the timer means accords with the program end time that has been set up by the timer setup means, and for recording character information about the radio station stored in the storing means to the management region of the record medium after the record operation is stopped.

* * * * *